ially, the present invention relates to a negative

United States Patent
Choi et al.

(10) Patent No.: US 11,764,349 B2
(45) Date of Patent: Sep. 19, 2023

(54) NEGATIVE ELECTRODE ACTIVE MATERIAL FOR LITHIUM SECONDARY BATTERY AND NEGATIVE ELECTRODE FOR LITHIUM SECONDARY BATTERY INCLUDING THE SAME

(71) Applicant: LG CHEM, LTD., Seoul (KR)

(72) Inventors: Hee Won Choi, Daejeon (KR); Jae Wook Lee, Daejeon (KR); Eun Kyung Kim, Daejeon (KR); Seung Youn Choi, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 432 days.

(21) Appl. No.: 16/966,740

(22) PCT Filed: Mar. 14, 2019

(86) PCT No.: PCT/KR2019/002988
§ 371 (c)(1),
(2) Date: Jul. 31, 2020

(87) PCT Pub. No.: WO2019/177403
PCT Pub. Date: Sep. 19, 2019

(65) Prior Publication Data
US 2020/0365875 A1    Nov. 19, 2020

(30) Foreign Application Priority Data

Mar. 15, 2018 (KR) .................. 10-2018-0030501

(51) Int. Cl.
| | | |
|---|---|---|
| H01M 4/133 | (2010.01) | |
| H01M 4/04 | (2006.01) | |
| H01M 10/0525 | (2010.01) | |
| H01M 10/44 | (2006.01) | |
| H01M 4/02 | (2006.01) | |

(52) U.S. Cl.
CPC ......... *H01M 4/133* (2013.01); *H01M 4/0404* (2013.01); *H01M 10/0525* (2013.01); *H01M 10/44* (2013.01); *H01M 2004/021* (2013.01); *H01M 2004/027* (2013.01)

(58) Field of Classification Search
CPC ............ H01M 4/133; H01M 4/0404; H01M 10/0525; H01M 2004/021; H01M 2004/027
See application file for complete search history.

(56) References Cited

U.S. PATENT DOCUMENTS

| | | |
|---|---|---|
| 2001/0031391 A1 | 10/2001 | Hironaka et al. |
| 2014/0287316 A1 | 9/2014 | Ahn et al. |
| 2015/0349335 A1 | 12/2015 | Won et al. |
| 2016/0322636 A1 | 11/2016 | Lee et al. |
| 2017/0125788 A1 | 5/2017 | Ahn et al. |
| 2018/0301702 A1 | 10/2018 | Park et al. |

FOREIGN PATENT DOCUMENTS

| | | | |
|---|---|---|---|
| CN | 106898740 A | 6/2017 | |
| CN | 107749462 A | 3/2018 | |
| EP | 2 953 192 A1 | 12/2015 | |
| JP | 2010-522969 A | 7/2010 | |
| KR | 2006098788 A * | 9/2006 | ........ H01M 10/0525 |
| KR | 10-2009-0107272 A | 10/2009 | |
| KR | 10-2010-0072160 A | 6/2010 | |
| KR | 101291050 B1 * | 8/2013 | ............ H01M 4/583 |
| KR | 10-2014-0095980 A | 8/2014 | |
| KR | 10-2015-0071249 A | 6/2015 | |
| KR | 10-2015-0134945 A | 12/2015 | |
| KR | 10-2015-0143334 A | 12/2015 | |
| KR | 10-2016-0051054 A | 5/2016 | |
| KR | 10-2017-0037597 A | 4/2017 | |
| WO | WO-2016018023 A1 * | 2/2016 | ............. C01B 32/20 |
| WO | WO-2016068516 A1 * | 5/2016 | .......... H01M 10/052 |

OTHER PUBLICATIONS

International Search Report (PCT/ISA/210) issued in PCT/KR2019/002988, dated Jun. 18, 2019.
Extended European Search Report for European Application No. 19766534.2, dated Mar. 15, 2021.

* cited by examiner

*Primary Examiner* — Christopher P Domone
*Assistant Examiner* — Jonathan William Estes
(74) *Attorney, Agent, or Firm* — Birch, Stewart, Kolasch & Birch, LLP

(57) ABSTRACT

A negative electrode active material for a lithium secondary battery, a negative electrode including the same, and a lithium secondary battery including the negative electrode. Specifically, the present invention relates to a negative electrode active material capable of minimizing changes in a structure and internal total pore volume of an electrode during rolling of the electrode by controlling the type and amount of carbon coated on a surface of an artificial graphite active material, a negative electrode including the same, and a lithium secondary battery including the negative electrode.

7 Claims, No Drawings

NEGATIVE ELECTRODE ACTIVE MATERIAL FOR LITHIUM SECONDARY BATTERY AND NEGATIVE ELECTRODE FOR LITHIUM SECONDARY BATTERY INCLUDING THE SAME

CROSS-REFERENCE TO RELATED APPLICATION

This application claims priority to and the benefit of Korean Patent Application No. 10-2018-0030501, filed on Mar. 15, 2018, the disclosure of which is incorporated herein by reference in its entirety.

TECHNICAL FIELD

The present invention relates to a negative electrode active material for a lithium secondary battery, a negative electrode including the same, and a lithium secondary battery including the negative electrode. Specifically, the present invention relates to a negative electrode active material capable of minimizing changes in a structure and internal total pore volume of an electrode during rolling of the electrode by controlling the type and amount of carbon coated on a surface of an artificial graphite active material, a negative electrode including the same, and a lithium secondary battery including the negative electrode.

BACKGROUND ART

A carbon-based negative electrode active material used for a negative electrode of a lithium secondary battery has a potential close to an electrode potential of lithium metal and has a small change in a crystal structure during intercalation and deintercalation of lithium ions, so that a redox reaction may be continuously and repeatedly performed at the electrode, thereby providing a basis for the lithium secondary battery to exhibit high capacity and an excellent lifespan.

Various types of materials such as natural graphite and artificial graphite, which are crystalline carbon-based materials, or hard carbon and soft carbon, which are amorphous carbon-based materials, are used as the carbon-based negative electrode active material. Among them, a graphite-based active material having excellent reversibility and thus capable of improving the lifespan characteristics of a lithium secondary battery is most widely used. Since a discharge voltage of the graphite-based active material is −0.2 V, which is lower than that of lithium, a battery using the graphite-based active material may exhibit a high discharge voltage of 3.6 V, thereby providing many advantages in terms of the energy density of a lithium secondary battery.

Since a crystal structure of graphite is formed by applying a high temperature of 2,500° C. or more to artificial graphite which is a crystalline carbon-based material, the artificial graphite has a more stable crystal structure than natural graphite and thus has a relatively long lifespan due to a small change in the crystal structure even during repetitive charging and discharging of lithium ions. In general, an artificial graphite-based negative electrode active material has a lifespan about 2 to 3 times longer than a natural graphite-based material.

Soft carbon and hard carbon, which are amorphous carbon-based materials in which the crystal structure is not stabilized, have characteristics that lithium ions move more smoothly. Accordingly, the soft carbon and the hard carbon may improve charging and discharging rates, and thus may be used for electrodes requiring high-speed charging.

Generally, the carbon-based materials are used after being mixed at a certain ratio in consideration of lifespan characteristics and output characteristics of a lithium secondary battery to be used.

Meanwhile, improving high-temperature performance (such as high-temperature storage characteristics and high-temperature cycle characteristics) of a lithium secondary battery is an important issue to be solved. When an internal total pore volume is high after a negative electrode active material is applied to a current collector and rolled, there is a high possibility that the high-temperature performance of a negative electrode is deteriorated. Thus, it is necessary to improve the high-temperature characteristics of a lithium secondary battery by minimizing changes in a structure and internal total pore volume of an electrode, which occur during electrode rolling.

Particularly, when developing a negative electrode material of a secondary battery for rapid charging, improvement in high-temperature characteristics is further required.

PRIOR ART LITERATURE

Patent Literature

Korean Patent Publication No. 10-2010-0072160

DISCLOSURE

Technical Problem

The present invention is directed to providing a negative electrode active material for a lithium secondary battery, which has improved high-temperature storage performance by minimizing changes in a structure and internal total pore volume of a negative electrode before and after rolling, and a negative electrode and lithium secondary battery including the same.

Technical Solution

One aspect of the present invention provides a negative electrode active material for a lithium secondary battery including artificial graphite and soft carbon on a surface of the artificial graphite, wherein the soft carbon is contained in an amount of more than 3 wt % and less than 5 wt % based on the combined weight of the artificial graphite and the soft carbon, and the negative electrode active material is defined such that when applied to a negative electrode current collector the negative electrode active material and rolled, the negative electrode active material has a total pore volume variation of 10 cm$^3$/g or less before and after being rolled.

The soft carbon may be contained in an amount of 3.5 wt % or more and 4.5 wt % or less based on the combined weight of the artificial graphite and the soft carbon.

The total pore volume of the negative electrode active material after being applied to an electrode current collector and rolled may be in a range of 10 cm$^3$/g to 20 cm$^3$/g, and the total pore volume of the negative electrode active material before being applied to an electrode current collector and rolled may be in a range of 20 cm$^3$/g to 30 cm$^3$/g.

The artificial graphite may have an average particle diameter $D_{50}$ of 15 μm to 25 μm.

Another aspect of the present invention provides a negative electrode for a lithium secondary battery including the negative electrode active material for a lithium secondary battery.

Still another aspect of the present invention provides a lithium secondary battery comprising the negative electrode for a lithium secondary battery, and the negative electrode for a lithium secondary battery of the present invention may be particularly usefully used in a lithium secondary battery for rapid charging.

Advantageous Effects

Changes in a structure and internal total pore volume of an electrode can be minimized during electrode rolling by controlling the type and amount of carbon coated on a surface of artificial graphite active material, thereby improving the high-temperature storage performance of a lithium secondary battery including a negative electrode produced using the negative electrode active material. The negative electrode of the present invention is particularly usefully used in a lithium secondary battery for rapid charging.

Modes for Invention

Hereinafter, the present invention will be described in more detail.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

Negative Electrode Active Material

A negative electrode active material of the present invention is a negative electrode active material for a lithium secondary battery and includes artificial graphite coated with soft carbon on a surface thereof, wherein the soft carbon is contained in an amount of more than 3 wt % and less than 5 wt % based on the combined weight of the artificial graphite and the soft carbon, and the negative electrode active material has a total pore volume variation of 10 cm$^3$/g or less before and after being rolled after being applied to the negative electrode current collector.

The soft carbon may be preferably contained in an amount of 3.5 wt % or more and 4.5 wt % or less, and more preferably, 3.8 wt % or more and 4.2 wt % or less based on the combined weight of the artificial graphite and the soft carbon in terms of minimizing changes in a structure and internal total pore volume of the electrode during rolling and further improving high-temperature storage performance.

Further, the total pore volume variation of the negative electrode active material before and after being rolled after being applied to the negative electrode current collector is preferably 8 cm$^3$/g or more and 10 cm$^3$/g or less.

The negative electrode active material of the present invention may solve the technical problems when all the components described above are combined organically.

That is, the negative electrode active material of the present invention may exhibit desired high-temperature storage performance only when the following conditions are satisfied, in which the soft carbon is contained in an amount of more than 3 wt % and less than 5 wt % based on the artificial graphite, and the total pore volume variation of the negative electrode active material before and after being rolled after being applied to the negative electrode current collector is equal to or less than 10 cm$^3$/g, and when any of these conditions is not satisfied, the desired high-temperature storage performance will not be exhibited.

The total pore volume of the negative electrode active material after being applied to an electrode current collector and rolled may be in the range of 10 cm$^3$/g to 20 cm$^3$/g, and preferably, 14 cm$^3$/g to 17 cm$^3$/g. Also, the total pore volume of the negative electrode active material before being applied to the electrode current collector and rolled may be in the range of 20 cm$^3$/g to 30 cm$^3$/g, and preferably, 24 cm$^3$/g to 27 cm$^3$/g.

When the total pore volume before rolling is more than 30 cm$^3$/g, since pore resistance increases due to a large number of internal pores, the performance of the electrode may not be positively affected even after rolling. In addition, when the total pore volume before rolling is less than 20 cm$^3$/g, a specific surface area of the electrode is small so that carbon coating with the desired amount may be difficult.

When the negative electrode active material is applied to an electrode current collector and rolled, the rolling may be performed such that target porosity is 25% to 32%, specifically, 26% to 30%, and more specifically, 28%. Within the above-described ranges, the energy density and rapid charging performance of the negative electrode active material applied to the electrode current collector may be improved while minimizing the changes in the structure and the total pore volume of the electrode, and thus the above-described ranges are preferable.

Specifically, the target porosity may be achieved by comprehensively considering the capacity and hardness of the negative electrode active material, the thickness of the negative electrode to be implemented, a loading amount, and the like, and accordingly appropriately adjusting a linear pressure during rolling and the number of times of rolling.

When the negative electrode active material is applied to an electrode current collector and rolled, the loading amount of the negative electrode active material may be 3.4 mAh/cm$^2$ to 3.8 mAh/cm$^2$, specifically, 3.5 mAh/cm$^2$ to 3.7 mAh/cm$^2$, and more specifically, 3.61 mAh/cm$^{2'}$ Within the above-described ranges, the energy density of the negative electrode active material may be improved and high capacity may be exhibited, and thus the above-described ranges are preferable.

The artificial graphite may have an average particle diameter D$_{50}$ of 15 μm to 25 μm, and preferably, 18 μm to 21 μm.

When the average particle diameter of the artificial graphite exceeds 25 μm, the tap density of the active material is increased and packing during the production of the electrode may be difficult so that it may be difficult to achieve desired electrode density, and the particle diameter of the negative electrode active material becomes large so that battery performance such as rapid charging performance and a charging rate may be reduced. When the average particle diameter of the artificial graphite is less than 15 μm, it may be difficult to exhibit an appropriate discharge capacity, and accordingly, the energy density may be lowered.

Negative Electrode and Production Method of the Negative Electrode

The negative electrode of the present invention includes the above-described negative electrode active material of the present invention.

The negative electrode of the present invention may be produced by a method including dissolving or dispersing the negative electrode active material of the present invention, a conductive material and/or a binder, or the like in a solvent to prepare a negative electrode mixture, and then applying the negative electrode mixture to at least one surface of the negative electrode current collector followed by drying and pressing, or laminating a film, which is obtained by casting the negative electrode mixture on a separate support and then peeling from the support, on the negative electrode current collector.

The negative electrode current collector is not particularly limited as long as it has high conductivity without causing a chemical change in a battery, and may include, for example, copper, stainless steel, aluminum, nickel, titanium, calcined carbon, copper or stainless steel whose surface is treated with carbon, nickel, titanium or silver, or an aluminum-cadmium alloy. Further, the negative electrode current collector may typically have a thickness of 3 µm to 500 µm, and may have fine irregularities on a surface of the current collector to increase adhesion between the current collector and the negative electrode active material. For example, the negative electrode current collector may be used in various forms including a film, a sheet, a foil, a net, a porous structure, a foam, a non-woven fabric, and the like.

The negative electrode active material may be contained in an amount of 80 wt % to 99 wt %, and more specifically, 85 wt % to 98 wt % based on the total weight of a negative electrode active material layer. When contained in the above-described content range, excellent capacity characteristics may be exhibited.

The conductive material, which is used for imparting conductivity to the electrode, may be used without particular limitation as long as it has electron conductivity without causing chemical changes in a battery. As specific examples of the conductive material, there are graphite such as natural or artificial graphite; carbon-based materials such as carbon black, acetylene black, Ketjen black, channel black, furnace black, lamp black, thermal black, and carbon fiber; powders or fibers of metals such as copper, nickel, aluminum, and silver; conductive whiskers such as zinc oxide and potassium titanate; conductive metal oxides such as titanium oxide; conductive polymers such as polyphenylene derivatives; and the like. These materials may be used alone or as a mixture of two or more thereof. The conductive material may be contained at 1 wt % to 30 wt % based on the total weight of the negative electrode active material layer.

In addition, the binder serves to improve cohesion between negative electrode active material particles, and an adhesive strength between the negative electrode active material and the current collector. As specific examples of the binder, there are polyvinylidene fluoride (PVdF), a vinylidene fluoride-hexafluoropropylene copolymer (PVdF-co-HFP), polyvinyl alcohol, polyacrylonitrile, carboxymethylcellulose (CMC), starch, hydroxypropyl cellulose, regenerated cellulose, polyvinyl pyrrolidone, polytetrafluoroethylene, polyethylene, polypropylene, an ethylene-propylene-diene polymer (EPDM), a sulfonated EPDM, styrene butadiene rubber (SBR), fluorine rubber, various copolymers thereof, and the like. These materials may be used alone or as a mixture of two or more thereof. The binder may be contained at 1 wt % to 30 wt % based on the total weight of the negative electrode active material layer.

Meanwhile, the solvent used in the preparation of the negative electrode mixture may be a solvent generally used in the art, and as the solvent, for example, dimethyl sulfoxide (DMSO), isopropyl alcohol, N-methyl pyrrolidone (NMP), acetone, water, or the like may be used alone or in a mixture thereof. A use amount of the solvent may be appropriately adjusted in consideration of the application thickness of a slurry, a production yield, viscosity, and the like.

Lithium Secondary Battery

Next, a lithium secondary battery according to the present invention will be described.

The negative electrode of the present invention may be usefully used for production of the lithium secondary battery.

Specifically, the lithium secondary battery according to the present invention includes a negative electrode, a positive electrode disposed to face the negative electrode, a separator interposed between the negative electrode and the positive electrode, and an electrolyte. Here, the negative electrode is the negative electrode produced by applying the negative electrode active material of the present invention described above.

Meanwhile, the secondary battery may selectively include a battery case accommodating an electrode assembly including the positive electrode, the negative electrode, and the separator, and a sealing member sealing the battery case.

The lithium secondary battery may be produced according to a conventional secondary battery production method, except that the negative electrode according to the present invention is used.

In the secondary battery, the positive electrode includes a positive electrode current collector and a positive electrode active material layer disposed on at least one surface of the positive electrode current collector.

The positive electrode may be produced according to a conventional positive electrode production method generally known in the art. For example, the positive electrode may be produced by a method including dissolving or dispersing the components constituting the positive electrode active material layer, that is, a positive electrode active material, a conductive material and/or a binder, or the like in a solvent to prepare a positive electrode mixture, and then applying the positive electrode mixture to at least one surface of the positive electrode current collector followed by drying and pressing, or laminating a film, which is obtained by casting the positive electrode mixture on a separate support and then peeling from the support, on the positive electrode current collector.

The positive electrode current collector is not particularly limited as long as it does not cause chemical changes in a battery and has conductivity. For example, stainless steel, aluminum, nickel, titanium, calcined carbon, or aluminum or stainless steel whose surface is treated with carbon, nickel, titanium, silver, or the like may be used as the positive electrode current collector. In addition, the positive electrode current collector may generally have a thickness of 3 µm to 500 µm, and the adhesion of the positive electrode active material may be increased by forming fine irregularities on a surface of the current collector. For example, the positive electrode current collector may be used in various forms such as a film, a sheet, a foil, a net, a porous structure, a foam, a non-woven fabric, and the like.

For example, the positive electrode active material may be a layered compound such as a lithium cobalt oxide ($LiCoO_2$), a lithium nickel oxide ($LiNiO_2$), or the like, or a compound substituted with one or more transition metals; a lithium manganese oxide represented by a formula $Li_{1+y}Mn_{2-y}O_4$ (where, y is in the range of 0 to 0.33), $LiMnO_3$, $LiMn_2O_3$, $LiMnO_2$, or the like; a lithium copper oxide ($Li_2CuO_2$); a vanadium oxide such as $LiV_3O_8$, $LiFe_3O_4$, $V_2O_5$, $Cu_2V_2O_7$, or the like; a Ni-site type lithium nickel oxide represented by a formula $LiNi_{1-y}M_yO_2$ (where, M=Co, Mn, Al, Cu, Fe, Mg, B, or Ga, and y is in the range of 0.01 to 0.3); a lithium manganese composite oxide represented by a formula $LiMn_{2-y}M_yO_2$ (where, M=Co, Ni, Fe, Cr, Zn, or Ta, and y is in the range of 0.01 to 0.1)] or a formula $Li_2Mn_3MO_8$ (where, M=Fe, Co, Ni, Cu, or Zn)]; $LiMn_2O_4$ in which a part of Li in a formula is substituted with an alkaline earth metal ion; a disulfide compound; $Fe_2(MoO_4)_3$, and the like, but the present invention is not limited thereto.

In addition, the binder and the conductive material may be the same as those described above with regard to the negative electrode.

Meanwhile, in the secondary battery, the separator may be any separator used in general secondary batteries as long as it separates a negative electrode from a positive electrode and provides a path for migration of lithium ions. In particular, a separator having a low resistance to ion transfer in an electrolyte and having an excellent electrolyte-retaining ability may be used. Specifically, a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer, or a laminated structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength and may be selectively used in a single-layer or multilayer structure.

Meanwhile, an organic liquid electrolyte, an inorganic liquid electrolyte, a solid polymer electrolyte, a gel-type polymer electrolyte, an inorganic solid electrolyte, a molten-type inorganic electrolyte or the like, which may be used in the production of secondary batteries, may be used as the electrolyte, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; nitriles such as Ra—CN (Ra is a linear, branched, or cyclic C2 to C20 hydrocarbon group and may include a double-bond aromatic ring or an ether bond); amides such as dimethylformamide; dioxolanes such as 1,3-dioxolane; sulfolane; and the like. Among these, the carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to 9, the electrolyte may exhibit excellent performance.

The lithium salt is not particularly limited as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like. The concentration of the lithium salt is preferably in the range of 0.1 M to 2.0 M. When the concentration of the lithium salt is contained in the above-described range, the electrolyte may have suitable conductivity and viscosity, and thus excellent electrolyte performance may be exhibited, and lithium ions may effectively move.

For the purpose of for improving lifespan characteristics of a battery, suppressing a reduction in the battery capacity, and improving a discharge capacity of the battery, the electrolyte may further include one or more additives, such as a haloalkylene carbonate-based compound such as difluoroethylene carbonate, pyridine, triethylphosphite, triethanolamine, cyclic ether, ethylene diamine, n-glyme, hexamphosphoric triamide, a nitrobenzene derivative, sulfur, a quinone imine dye, N-substituted oxazolidinone, N, N-substituted imidazolidine, ethylene glycol dialkyl ether, ammonium salts, pyrrole, 2-methoxy ethanol, aluminum trichloride, or the like in addition to the components of the electrolyte. Here, the additive may be contained in an amount of 0.1 wt %% to 5 wt % based on the total weight of the electrolyte.

EXAMPLES

Example 1

[Preparation of Negative Electrode Active Material]

Soft carbon was coated on a surface of artificial graphite having an average particle diameter $D_{50}$ of 20 m such that an amount of the soft carbon corresponded to 4 wt % based on a combined weight of the artificial graphite and the soft carbon to prepare a negative electrode active material.

The coating of the soft carbon was performed by mixing the artificial graphite and pitch and firing for 360 minutes at a temperature of 2,000° C.

[Production of Negative Electrode]

The negative electrode active material, Super C65 as a conductive material, styrene-butadiene rubber (SBR) as a binder, and carboxymethylcellulose (CMC) as a thickener were mixed in a weight ratio of 95.6:1:2.3:1.1, respectively, and water was added to prepare a negative electrode slurry. This slurry was applied to a copper foil, and vacuum-dried for 8 hours at about 130° C., and then rolled to a target porosity of 28% to produce a negative electrode of 1.4875 $cm^2$ (the area of the portion to which the negative electrode slurry was applied). Here, the negative electrode was produced such that the loading amount of the negative electrode was 3.61 $mAh/m^2$.

[Production of Secondary Battery]

An electrode assembly was produced by using the produced negative electrode and a Li metal as a counter electrode and interposing a polyolefin separator between the negative electrode and the Li metal.

A non-aqueous electrolyte was prepared by adding $LiPF_6$ at a concentration of 1M to a non-aqueous electrolyte solvent in which ethylene carbonate and ethyl methyl carbonate were mixed in a volume ratio of 3:7, and then injected into the electrode assembly to produce a coin-type half secondary battery.

Example 2

A negative electrode active material, a negative electrode, and a secondary battery were produced in the same manner as in Example 1, except that the soft carbon was coated such that the amount of the soft carbon during the preparation of the negative electrode active material corresponded to 3.5 wt % based on a combined weight of the artificial graphite and the soft carbon.

Example 3

A negative electrode active material, a negative electrode, and a secondary battery were produced in the same manner as in Example 1, except that the soft carbon was coated such that the amount of the soft carbon during the preparation of the negative electrode active material corresponded to 4.5 wt % based on a combined weight of the artificial graphite and the soft carbon.

Comparative Example 1

A negative electrode active material, a negative electrode, and a secondary battery were produced in the same manner as in Example 1, except that the soft carbon was coated such that the amount of the soft carbon during the preparation of the negative electrode active material corresponded to 5 wt % based on a combined weight of the artificial graphite and the soft carbon.

Comparative Example 2

A negative electrode active material, a negative electrode, and a secondary battery were produced in the same manner as in Example 1, except that the soft carbon was coated such that the amount of the soft carbon during the preparation of the negative electrode active material corresponded to 3 wt % based on a combined weight of the artificial graphite and the soft carbon.

Comparative Example 3

A negative electrode active material, a negative electrode, and a secondary battery were produced in the same manner as in Comparative Example 2, except that hard carbon was used instead of the soft carbon during the preparation of the negative electrode active material.

Comparative Example 4

A negative electrode active material, a negative electrode, and a secondary battery were produced in the same manner as in Comparative Example 3, except that the hard carbon was coated such that the amount of the hard carbon during the preparation of the negative electrode active material corresponded to 4 wt % based on a combined weight of the artificial graphite and the soft carbon.

Comparative Example 5

A negative electrode active material, a negative electrode, and a secondary battery were produced in the same manner as in Comparative Example 3, except that the hard carbon was coated such that the amount of the hard carbon during the preparation of the negative electrode active material corresponded to 3.5 wt % based on a combined weight of the artificial graphite and the soft carbon.

Comparative Example 6

A negative electrode active material, a negative electrode, and a secondary battery were produced in the same manner as in Comparative Example 3, except that the hard carbon was coated such that the amount of the hard carbon during the preparation of the negative electrode active material corresponded to 4.5 wt % based on a combined weight of the artificial graphite and the soft carbon.

Comparative Example 7

A negative electrode active material, a negative electrode, and a secondary battery were produced in the same manner as in Example 1, except that natural graphite was used instead of the artificial graphite during the preparation of the negative electrode active material.

EXPERIMENTAL EXAMPLES

Experimental Example 1: Measurement of Total Pore Volume Variation

Total pore volumes before and after rolling were measured in each of Examples 1 to 3 and Comparative Examples 1 to 7 during the production of each negative electrode, and differences in pore volume are shown in Table 1 below.

The total pore volumes before and after rolling were measured by a Brunauer-Emmett-Teller (BET) measurement method using BELSORP (BET equipment) manufactured by BEL JAPAN.

Experimental Example 2: High-Temperature Storage Test

A cycle of charging coin type half-cells produced in Examples 1 to 3 and Comparative Examples 1 to 7 at a constant current (CC)/constant voltage (CV) of 0.1 C and 5 mV at 25° C., cutting at 0.005 C, and then discharging to 1.5 V at a CC of 0.1 C was performed for two cycles. Thereafter, in a third cycle, the discharging was continued to a state of charge (SOC) of 5% at 0.05 C, and then, the coin type half-cells were set in a state of being charged to a SOC of 95%.

The coin type half-cells set to a SOC of 95% were stored in a high-temperature chamber at 60° C. for 4 weeks, and then, remaining capacity retention rates (%) were confirmed while discharging at 0.1 C, and the results are shown in Table 1 below.

TABLE 1

| | Graphite type | Carbon coating type | Carbon coating amount (wt %) | Total pore volume before rolling (cm³/g) | Total pore volume after rolling (cm³/g) | Pore volume variation (Δcm³/g) | 4 weeks high-temperature storage remaining capacity (mAh) | 4-weeks high-temperature storage capacity retention rate (%) |
|---|---|---|---|---|---|---|---|---|
| Example 1 | Artificial graphite | Soft carbon | 4 | 26 | 16 | 10 | 4.51 | 88.9 |
| Example 2 | Artificial graphite | Soft carbon | 3.5 | 22 | 14 | 8 | 4.48 | 88.5 |

TABLE 1-continued

|  | Graphite type | Carbon coating type | Carbon coating amount (wt %) | Total pore volume before rolling (cm³/g) | Total pore volume after rolling (cm³/g) | Pore volume variation (Δcm³/g) | 4 weeks high-temperature storage remaining capacity (mAh) | 4-weeks high-temperature storage capacity retention rate (%) |
|---|---|---|---|---|---|---|---|---|
| Example 3 | Artificial graphite | Soft carbon | 4.5 | 21 | 11 | 10 | 4.46 | 88.2 |
| Comparative Example 1 | Artificial graphite | Soft carbon | 5 | 36 | 21 | 15 | 4.31 | 84.3 |
| Comparative Example 2 | Artificial graphite | Soft carbon | 3 | 25 | 22 | 3 | 4.32 | 85.1 |
| Comparative Example 3 | Artificial graphite | Hard carbon | 3 | 44 | 24 | 20 | 4.17 | 82.1 |
| Comparative Example 4 | Artificial graphite | Hard carbon | 4 | 55 | 30 | 25 | 4.12 | 81.1 |
| Comparative Example 5 | Artificial graphite | Hard carbon | 3.5 | 58 | 36 | 22 | 4.14 | 81.7 |
| Comparative Example 6 | Artificial graphite | Hard carbon | 4.5 | 65 | 37 | 28 | 4.03 | 79.5 |
| Comparative Example 7 | Natural graphite | Soft carbon | 4 | 57 | 31 | 26 | 4.10 | 80.8 |

As shown in Table 1, it was confirmed that the total pore volume variation of the negative electrodes using the negative electrode active materials of the Examples was smaller than those of the negative electrodes of the Comparative Examples and thus the high-temperature storage performance was improved.

That is, it was determined that when the electrode is rolled, the occurrence of damage in the artificial graphite of the present invention, on which the soft carbon is applied in an amount of more than 3 wt % and less than 5 wt %, is suppressed so that the total pore volume variation in the electrode is reduced, and accordingly, sites where side reactions with the electrolyte may occur at a high temperature are reduced, thereby preventing lithium ion loss when stored at a high temperature.

Meanwhile, the pore volume variation exceeds 10 cm³/g and the high-temperature storage characteristics are deteriorated when the coating amount of the soft carbon relative to artificial graphite exceeds the ranges of the present invention (see Comparative Example 1). Further, even when the pore volume variation is within the ranges of the present invention, the high-temperature storage characteristics are still deteriorated when the coating amount of the soft carbon relative to artificial graphite is less than the ranges of the present invention (see Comparative Example 2).

In addition, even when the coating amount of the carbon coating is within the ranges of the present invention, the pore volume variation is not within the ranges of the present invention and the high-temperature storage characteristics are also significantly deteriorated when the hard carbon rather than the soft carbon is coated on the artificial graphite (see Comparative Examples 4 to 6).

Meanwhile, even when the soft carbon is coated on the natural graphite, rather than artificial graphite, within the ranges of the present invention, the volume variation is not within the ranges of the present invention, and the high-temperature storage characteristics are also significantly deteriorated (see Comparative Example 7).

Thus, it was also confirmed that it is difficult for the present invention to achieve the desired effect when any one of the conditions of the negative electrode active material of the present invention is not satisfied.

The invention claimed is:

1. A negative electrode active material for a lithium secondary battery, comprising:

artificial graphite; and
soft carbon on a surface of the artificial graphite,
wherein the soft carbon is present in an amount of 3.5 wt % or more and 4.5 wt % or less based on a combined weight of the artificial graphite and the soft carbon, and
the negative electrode active material is defined such that when applied to a negative electrode current collector the negative electrode active material and rolled, the negative electrode active material has a total pore volume variation of 10 cm³/g or less before and after being rolled,
wherein the total pore volume variation is a difference between a total pore volume of the negative electrode active material before being applied to the negative electrode current collector and rolled, and a total pore volume of the negative electrode active material after being applied to the negative electrode current collector and rolled.

2. The negative electrode active material of claim 1, wherein the total pore volume of the negative electrode active material after being applied to the negative electrode current collector and rolled is in a range of 10 cm³/g to 20 cm³/g.

3. The negative electrode active material of claim 1, wherein the total pore volume of the negative electrode active material after being applied to the electrode current collector and before being rolled is in a range of 20 cm³/g to 30 cm³/g.

4. The negative electrode active material of claim 1, wherein the total pore volume variation of the negative electrode active material after being applied to the negative electrode current collector and before and after being rolled is 8 cm³/g or more and 10 cm³/g or less.

5. The negative electrode active material of claim 1, wherein the artificial graphite has an average particle diameter $D_{50}$ of 15 μm to 25 μm.

6. A negative electrode for a lithium secondary battery comprising the negative electrode active material for the lithium secondary battery of claim 1.

7. A lithium secondary battery comprising the negative electrode for a lithium secondary battery of claim 6.

* * * * *